Jan. 16, 1968  K. H. MACHER  3,363,964
OPTICAL OBJECTIVE SYSTEM WITH INTERCHANGEABLE
VARIFOCAL AND TELESCOPIC LENS GROUPS
Filed Dec. 23, 1964  2 Sheets-Sheet 1
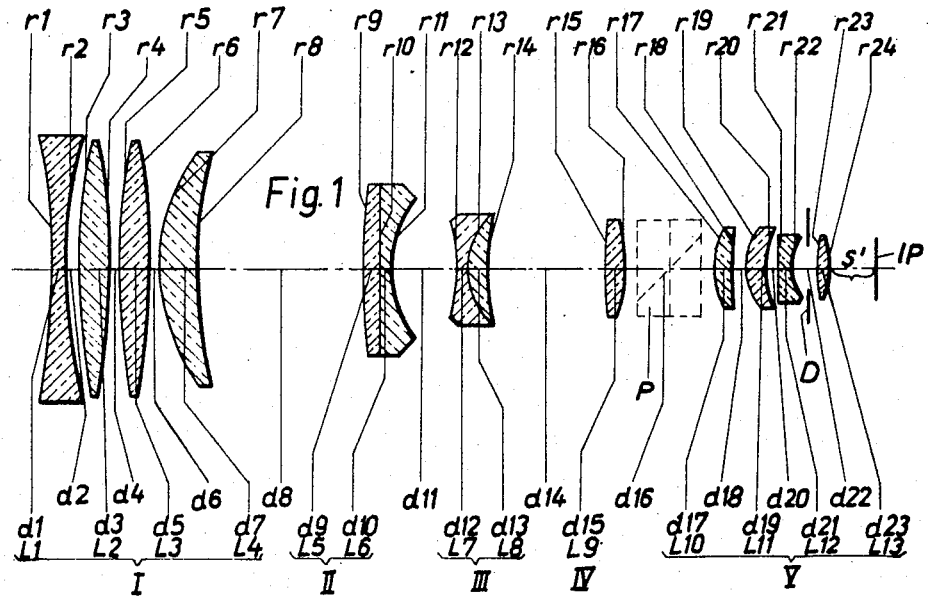
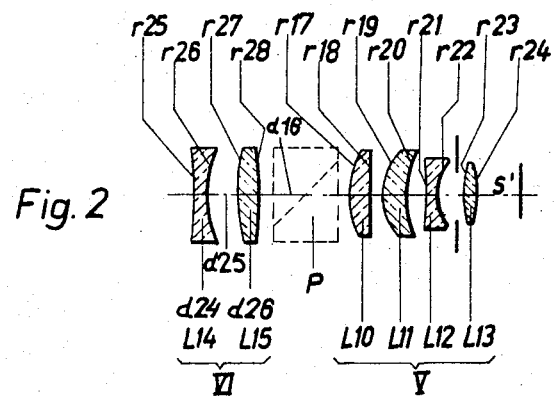
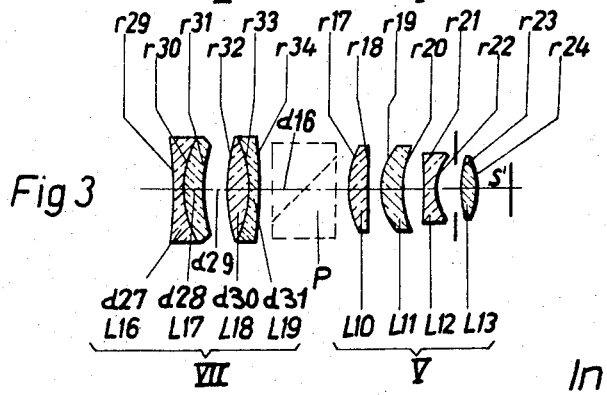
Inventor:
Karl Heinrich Macher
Karl J. Ross
AGENT

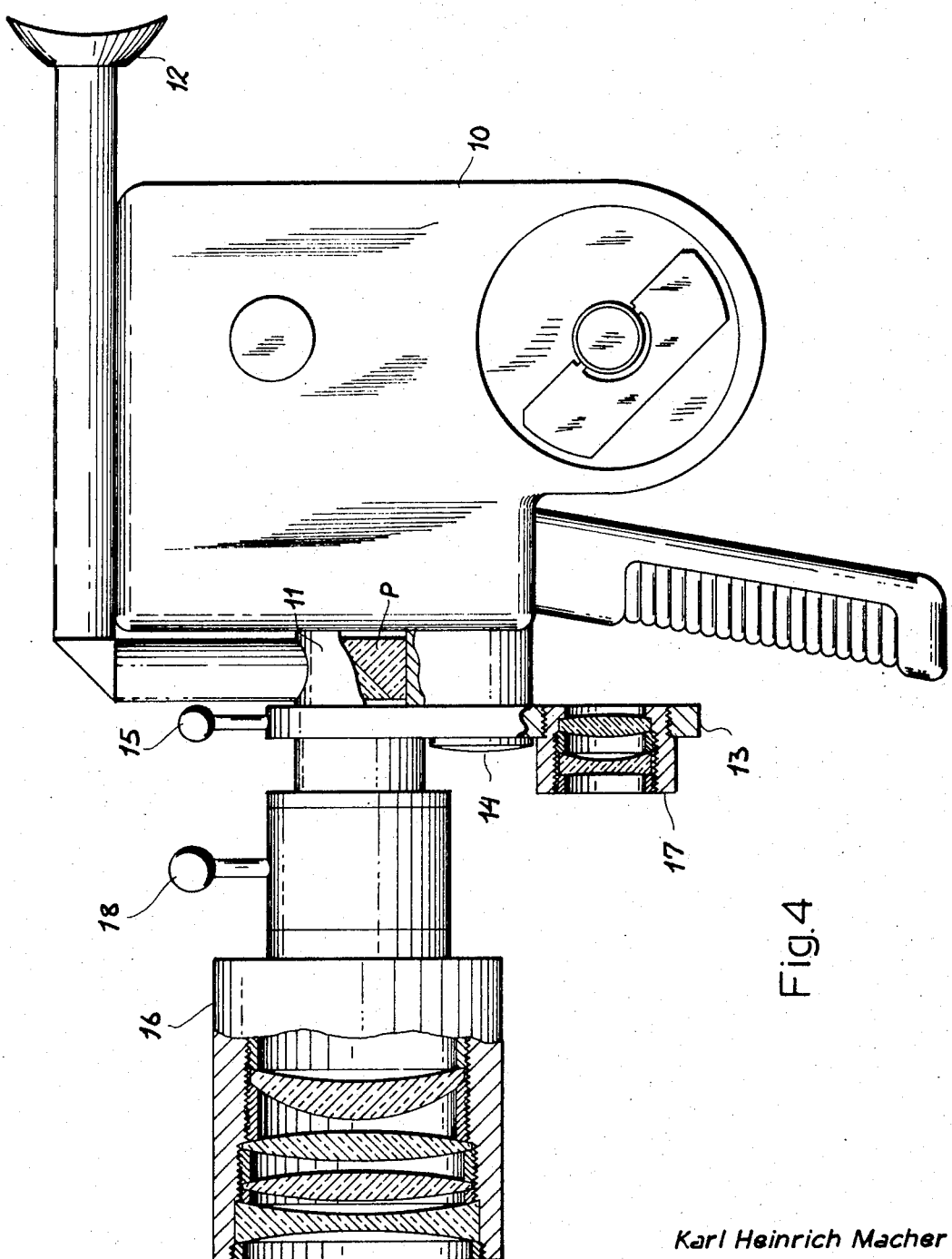

United States Patent Office 3,363,964
Patented Jan. 16, 1968

3,363,964
OPTICAL OBJECTIVE SYSTEM WITH INTERCHANGEABLE VARIFOCAL AND TELESCOPIC LENS GROUPS
Karl Heinrich Macher, Bad Kreuznach, Germany, assignor to Jos. Schneider & Co., Bad Kreuznach, Rhineland, Germany, a corporation of Germany
Filed Dec. 23, 1964, Ser. No. 420,650
Claims priority, application Germany, Jan. 9, 1964, Sch 34,429
6 Claims. (Cl. 350—176)

The present invention relates to a varifocal optical objective system for photographic or cinematographic cameras of the general type disclosed in my copending applications Ser. No. 291,851 filed July 17, 1963, now Patent No. 3,235,700, and Ser. No. 401,128 filed Oct. 2, 1964.

A system of this type includes a fixed rear lens group or basic objective and an adjustable front lens group or varifocal attachment, the latter consisting of two substantially stationary outer components of positive refractivity bracketing two axially movable inner components of negative refractivity. The term "substantially stationary" allows for the possibility that an element of either of these positive components, especially a front lens forming part of the first component as seen from the object side of the system, may be limitedly displaceable for focusing purposes.

In the system disclosed in my above-identified copending applications, as well as in a broadly similar system forming the subject matter of commonly assigned application Ser. No. 126,306 filed Feb. 24, 1961 by Günter Klemt and me, and now abandoned, the first movable component (i.e. the second component as seen from the object side) consists of two air-spaced lens members whereas the two following components of the varifocal group are constituted by individual lens members; in an objective of the type shown in my copending applications referred to, the positive first component of the varifocal group consists of four air-spaced singlets of large diameter including a dispersive front lens followed by three collective lenses.

It is an object of my present invention to provide a high-speed varifocal system of this character so proportioned in its radii of curvature and other optically effective parameters that the diameters of the lenses of the first component can be considerably reduced without objectionable vignetting.

Another object of this invention is to provide a system of this type which is operative over a wide varifocal range, such as 6:1, and with a large relative aperture, such as 1:1.8, yet which is structurally simplified through replacement of the two-member second component of the earlier systems by a single lens member of negative refractivity.

It is also an object of this invention to realize the aforestated advantages along with a high degree of achromatism and correction for spherical aberrations, astigmatism, field curvature and coma.

A further object of this invention is to provide, in an objective system having the qualities set forth above, means for optionally replacing its varifocal front group by a fixed-focus attachment designed to shorten the effective focal length of the basic objective and to compensate for any aberrations, especially chromatic ones, that would be present in this basic objective upon removal of the varifocal front attachment.

A particular field of application for the present improvement is a cinematographic camera objective designed for 8-mm. motion-picture film with a short focal length of, say, 13 mm. and with a diaphragm positioned at close distance from the image plane just ahead of the last lens of the basic objective, there being preferably also provided a reflex prism ahead of the fixed rear lens group.

I have found that, especially in the case of a system of the type just mentioned in which a diaphragm must be positioned close to the rear vertex for structural reasons, the entrance pupil can be moved close enough to the front to permit a desirable reduction of lens diameters if, in conformity with a feature of this invention, the absolute value of the individual focal length of the negatively refracting second component of the varifocal group is greater than one-half the individual focal length of the positive first component of that group and if, concurrently, the absolute value of the individual focal length of the negative third component is less than 0.7 times the individual focal length of the positive fourth component of the group.

Another feature of my invention, designed to afford good correction of residual aberrations, resides in such a dimensioning of the negatively refracting movable second and third components of the varifocal group that the absolute ratio of the radii of curvature of the less strongly concave rear surface and the more strongly concave front surface of the third component is less than one-tenth the absolute value of the ratio of the radii of curvature of the slightly convex front surface and the strongly concave rear surface of the second component. For improved achromatism I prefer, pursuant to still another feature of this invention, to design each of these movable components as a doublet with a positively refracting cemented surface, the absolute ratio of the larger radius of curvature of the preferably forwardly concave cemented surface of the second component and of the smaller radius of curvature of the preferably forwardly convex cemented surface of the third component being greater than 10.

Yet another feature of my invention involves the provision of means for replacing the aforedescribed four-component varifocal group by a fixed-focus attachment consisting of two air-spaced lens members of opposite refractivity adapted to compensate for residual chromatic aberrations of the basic objective. These lens members may be singlets, in which case they should be made of glass with a refractivity index greater than 1.7 and an Abbé number less than 40; they could also be designed as doublets, however, in which event less expensive glasses with lower refractive indices may be used. In a system of the latter type I have found it to be advantageous, for optical correction, to make the cemented surfaces of the two doublets positively refracting and of opposite curvature, the absolute ratio of the radii of curvature of these two surfaces being preferably close to unity and in any case not greater than 3.

The invention will be described hereafter with greater detail, reference being made to the accompanying drawing in which:

FIG. 1 is a lens diagram illustrating a complete varifocal objective system embodying the invention;

FIG. 2 is a diagram showing the varifocal front group of the system of FIG. 1 replaced by a fixed-focus two-member front attachment;

FIG. 3 is a view similar to FIG. 2, showing a modified two-member attachment; and FIG. 4 is an elevational view (parts broken away) of a camera having a varifocal objective with interchangeable front attachments in accordance with FIGS. 1 and 2.

The system shown in FIG. 1 comprises a varifocal group consisting of four components I, II, III and IV removably positioned in front of a fixed basic objective V. Component I consists of a biconcave front lens L1 with radii $r1$, $r2$ and thickness $d1$, a first biconvex lens L12 with radii $r3$, $r4$ and thickness $d3$, a second biconvex lens L3 with radii $r5$, $r6$ and thickness $d5$, and a meniscus-shaped further positive lens L4 with radii $r7$, $r8$ and thickness $d7$, these four lenses being separated from one another by air spaces $d2$, $d4$ and $d6$ of which the first one may be limitedly variable for focusing purposes as is known per se. A variable air space $d8$ separates positive component I from the axially movable negative component II which is in the form of a doublet composed of a positive lens L5 (radii $r9$, $r10$, thickness $d9$) and a negative lens L6 (radii $r10$, $r11$, thickness $d10$); another variable air space $d11$ intervenes between this component and the second movable negative component III, also in the form of a doublet, which consists of a negative lens L7 (radii $r12$, $r13$, thickness $d12$) and a positive lens L8 (radii $r13$, $r14$, thickness $d13$). Yet another variable air space $d14$ separates component III from the fixed positive component IV constituted by a single lens L9 (radii $r15$, $r16$, thickness $d15$). A relatively large air space $d16$, adapted to receive a reflex prism P, is formed between component IV and the concavoconvex first positive lens L10 (radii $r17$, $r18$, thickness $d17$) of rear lens group V, this lens being separated by an air space $d18$ from another concavoconvex positive lens L11 (radii $r19$, $r20$, thickness $d19$); a biconcave lens L12 (radii $r21$, $r22$, thickness $d21$), constituting the sole negative member of group V, is separated from lens L11 by an air space $d20$ and from the final lens L13 (radii $d23$, $d24$, thickness $d23$) by an air space $d22$ containing a diaphragm D. At $s'$ I have indicated the back-focal length of the system as measured between the rear vertex of lens L13 and the image plane IP.

In FIG. 2 I have shown the varifocal attachment I–IV replaced by a lens group VI consisting of a single biconcave lens L14 (radii $r25$, $r26$, thickness $d24$) separated by an air space $d25$ from a single biconvex lens L15 (radii $r27$, $r28$, thickness $d26$).

According to FIG. 3, the group VI has been replaced by the group VII whose negatively refracting first member is a doublet composed of two lenses L16 (radii $r29$, $r30$, thickness $d27$) and L17 (radii $r30$, $r31$, thickness $d28$), the associated positively refracting member being also a doublet composed of a lens L18 (radii $r32$, $r33$, thickness $d30$) and a lens L19 (radii $r33$, $r34$, thickness $d31$). The air space separating the two members of group VII has been designated $d29$.

In both FIG. 2 and FIG. 3 the air space $d16$ accommodating the prism P has the same magnitude as in the system of FIG. 1.

In the following Table A, I have listed representative numerical values for the radii $r1$–$r24$, the thickness and air spaces $d1$–$d23$, the refractive indices $n_d$ and the Abbé numbers $v$ of a system as shown in FIG. 1, constituting an objective with a relative aperture of 1:1.8 and a varifocal range of 35 to 200 linear units; each linear unit may represent a length of 0.2 mm. so that the system would have minimum and maximum focal lengths of 7 and 40 mm. respectively. The back-focal length $s'$ measures 45 units or 9 mm.

TABLE A

| Component | Lens | Radii | Thicknesses and Air Spaces | $n_d$ | $v$ |
|---|---|---|---|---|---|
| I | L1 | $r1 = -552.80$ | $d1 = 8.50$ | 1.74080 | 28.05 |
| | | $r2 = +468.80$ | $d2 = 8.50$ | Air Space | |
| | L2 | $r3 = +627.10$ | $d3 = 27.50$ | 1.62041 | 60.29 |
| | | $r4 = -627.10$ | $d4 = 0.50$ | Air Space | |
| | L3 | $r5 = +627.10$ | $d5 = 27.50$ | 1.62041 | 60.29 |
| | | $r6 = -627.10$ | $d6 = 0.50$ | Air Space | |
| | L4 | $r7 = +171.55$ | $d7 = 30.00$ | 1.62041 | 60.29 |
| | | $r8 = +415.40$ | $d8 = 5.10$–$145.60$ | Var. Air Space | |
| II | L5 | $r9 = +944.50$ | $d9 = 12.50$ | 1.80518 | 25.46 |
| | L6 | $r10 = -1,832.50$ | $d10 = 5.00$ | 1.51821 | 65.18 |
| | | $r11 = +67.15$ | $d11 = 95.30$–$28.50$ | Var. Air Space | |
| III | L7 | $r12 = -137.95$ | $d12 = 5.00$ | 1.71300 | 53.89 |
| | L8 | $r13 = +57.00$ | $d13 = 12.50$ | 1.80518 | 25.46 |
| | | $r14 = +156.05$ | $d14 = 77.10$–$3.40$ | Var. Air Space | |
| IV | L9 | $r15 = +349.40$ | $d15 = 5.00$ | 1.65830 | 57.29 |
| | | $r16 = -173.40$ | $d16 = 35.00$ | Air Space (Prism) | |
| V | L10 | $r17 = +59.95$ | $d17 = 9.00$ | 1.59181 | 58.25 |
| | | $r18 = +901.75$ | $d18 = 0.50$ | Air Space | |
| | L11 | $r19 = +37.25$ | $d19 = 13.00$ | 1.71300 | 53.89 |
| | | $r20 = +86.90$ | $d20 = 2.00$ | Air Space | |
| | L12 | $r21 = -475.00$ | $d21 = 5.00$ | 1.80518 | 25.46 |
| | | $r22 = +28.70$ | $d22 = 11.55$ | Air Space | |
| | L13 | $r23 = +121.00$ | $d23 = 8.35$ | 1.62280 | 56.88 |
| | | $r24 = -48.05$ | $d_{total} = 404.85$ | | |

The system representative of the foregoing Table A has individual focal lengths $f_I$–$f_V$ for the various components as listed below:

TABLE B $f_I = +274.60$
$f_{II} = -150.28$
$f_{III} = -112.55$
$f_{IV} = +176.65$
$f_V = +77.50$

It will be noted from Table B that the system of FIG. 1 satisfies the relationships $$|f_{II}| > \frac{f_I}{2} \tag{1}$$

and $$|f_{III}| < 0.7 f_{IV} \tag{2}$$

also, that $$10\left|\frac{r14}{r12}\right|<\left|\frac{r9}{r11}\right| \quad (3)$$

and that $$\left|\frac{r10}{r13}\right|>10 \quad (4)$$

Upon adjustment of the system for different overall focal lengths $f$, the variable air spaces $d8$, $d11$ and $d14$ assume the values given in the following Table C:

TABLE C

| $f$ | 35 mm. | 50 mm. | 100 mm. | 150 mm. | 200 mm. |
|---|---|---|---|---|---|
| $d8$ | 5.10 | 47.40 | 111.40 | 135.40 | 145.60 |
| $d11$ | 95.30 | 57.00 | 15.30 | 16.15 | 28.50 |
| $d14$ | 77.10 | 73.10 | 50.80 | 25.95 | 3.40 |

The parameters of group VI (FIG. 2) are listed in the following Table D for a system VI–V whose overall focal length has a magnitude of 66.5 units or about 13 mm:

TABLE D

| Component | Lens | Radii | Thicknesses and Air Spaces | $n_d$ | $\nu$ |
|---|---|---|---|---|---|
| VI | L14 | $r25=-392.80$ | $d24=7.50$ | 1.75692 | 31.74 |
| | | $r26=+159.20$ | $d25=20.85$ | Air Space | |
| | L15 | $r27=+196.95$ | $d26=12.50$ | 1.78470 | 26.10 |
| | | $r28=-429.00$ | | | |

Corresponding parameters for the group VII of FIG. 3 are listed in the following Table E, again for a system whose overall focal length equals 66.5 units.

TABLE E

| Component | Lens | Radii | Thicknesses and Air Spaces | $n_d$ | $\nu$ |
|---|---|---|---|---|---|
| VII | L16 | $r29=-325.40$ | $d27=5.00$ | 1.63636 | 35.35 |
| | L17 | $r30=+58.70$ | $d28=12.50$ | 1.67790 | 55.52 |
| | | $r31=+128.30$ | $d29=18.55$ | Air Space | |
| | L18 | $r32=+157.80$ | $d30=15.00$ | 1.63980 | 34.60 |
| | L19 | $r33=-56.60$ | $d31=5.00$ | 1.63854 | 55.43 |
| | | $r34=-380.70$ | | | |

The relative aperture and the back-focal length $s'$ of the system of FIGS. 2 and 3 have the same values as in the varifocal objective system of FIG. 1 (Table A).

It will be seen that the radii $r30$ and $r33$ of the oppositely curved and positively refracting cemented surfaces of doublets L16–L17 and L18–L19 satisfy the relationship $$\left|\frac{r30}{r33}\right|<3 \quad (5)$$

In FIG. 4 I have shown a motion-picture camera 10 with lens mount 11, a viewfinder 12 and a turret 13 rotatable on a stud 14 by means of a handle 15, this turret supporting two further lens mounts 16 and 17. Lens mount 11 accommodates the prism P and the elements (not shown in FIG. 4) of the fixed lens group V shown in FIGS. 1–3; lens mount 16 supports the varifocal attachment I–IV of FIG. 1 (partially illustrated in FIG. 4) whose movable components II, III can be shifted by a handle 18 to vary the overall focal length, whereas lens mount 17 holds the lenses of group VI of FIG. 2. It will be understood that mount 17 could alternatively accommodate the lenses of group VIII (FIG. 3). Thus, rotation of the turret 13 by handle 15 will selectively align the basic objective with either the attachment I–IV or one of the attachments VI, VII.

I claim:

1. An optical objective system with an overall focal length variable between a minimum overall focal length and a maximum overall focal length through three intermediate overall focal lengths, said system comprising:
a fixed-focus rear lens group consisting of a first positive singlet, a second positive singlet, a negative singlet following one another in the order named; and
a varifocal forward lens group consisting of:
a substantially fixed positive first element consisting of three air-spaced positive lenses and a dispersive front lens preceding said three air-spaced positive front lenses,
an axially movable second component consisting of a first dispersive lens member in the form of a doublet with a positively refracting cemented surface,
an axially movable negative third component consisting of a second dispersive lens member in the form of a doublet with a positively refracting cemented surface, and
a substantially fixed positive fourth component consisting of a single collective lens member;
said second and third components being movable relatively to each other and to said first and fourth components through five positions corresponding respectively to said minimum overall focal length, said three intermediate overall focal lengths and said maximum overall focal length, the numerical values of the radii of curvature ($r1$ to $r24$) of said dispersive front lens L1, said three air-spaced positive lenses (L2, L3, L4), said first dispersive lens member (L5, L6), said second dispersive lens member (L7, L8), said fourth component L9, said first positive singlet L10, said second positive singlet L11, said negative singlet L12 and said third positive singlet L13, of the axial thicknesses and air spaces ($d1$ to $d23$) thereof, based upon numerical values of 35 and 200, respectively, for said minimum and maximum overall focal lengths of the system, the refractive indices $n_d$ of the lenses (L1 to L13) and their Abbé numbers $\nu$ being substantially as given in the following table with the values of ($d8$, $d11$ and $d14$) being given for said minimum overall focal length:

| Component | Lens | Radii | Thicknesses and Air Spaces | $n_d$ | $\nu$ |
|---|---|---|---|---|---|
| I | L1 | $r1=-552.80$ | $d1=8.50$ | 1.74080 | 28.05 |
| | | $r2=+468.80$ | $d2=8.50$ | Air Space | |
| | L2 | $r3=+627.10$ | $d3=27.50$ | 1.62041 | 60.29 |
| | | $r4=-627.10$ | $d4=0.50$ | Air Space | |
| | L3 | $r5=+627.10$ | $d5=27.50$ | 1.62041 | 60.29 |
| | | $r6=-627.10$ | $d6=0.50$ | Air Space | |
| | L4 | $r7=+171.55$ | $d7=30.00$ | 1.62041 | 60.29 |
| | | $r8=+415.40$ | $d8=5.10$ | Air Space | |
| II | L5 | $r9=+944.50$ | $d9=12.50$ | 1.80518 | 25.46 |
| | L6 | $r10=-1,832.50$ | $d10=5.00$ | 1.51821 | 65.18 |
| | | $r11=+67.15$ | $d11=95.30$ | Air Space | |
| III | L7 | $r12=-137.95$ | $d12=5.00$ | 1.71300 | 53.89 |
| | L8 | $r13=+57.00$ | $d13=12.50$ | 1.80518 | 25.46 |
| | | $r14=+156.05$ | | | |

| Component | Lens | Radii | Thicknesses and Air Spaces | $n_d$ | $\nu$ |
|---|---|---|---|---|---|
| IV | L9 | r15=+349.40<br>r16=−173.40 | d14=77.10<br>d15=5.00<br>d16=35.00 | Air Space<br>1.65830<br>Space | 57.29 |
| V | L10 | r17=+59.95<br>r18=+901.75 | d17=9.00<br>d18=0.50 | 1.59181<br>Air Space | 58.25 |
| V | L11 | r19=+37.25<br>r20=+86.90 | d19=13.00<br>d20=2.00 | 1.71300<br>Air Space | 53.89 |
| V | L12 | r21=−475.00<br>r22=+28.70 | d21=5.00<br>d22=11.55 | 1.80518<br>Air Space | 25.46 |
| V | L13 | r23=+121.00<br>r24=−48.05 | d23=8.35 | 1.62280 | 56.88 |

2. A system as defined in claim 1 wherein said spacings (d8, d11 and d14) have values in positions of said second and third components corresponding respectively to intermediate overall focal lengths of numerical values of 50, 100 and 150 and to said maximum overall focal length of 200 as given in the following table:

| $f$ | 50 mm. | 100 mm. | 150 mm. | 200 mm. |
|---|---|---|---|---|
| d8 | 47.40 | 111.40 | 135.40 | 145.60 |
| d11 | 57.00 | 15.30 | 16.15 | 28.50 |
| d14 | 73.10 | 50.80 | 25.95 | 3.40 |

3. A system as defined in claim 1, further including turret means disposed forwardly of said rear lens group and carrying said varifocal forward lens group and a fixed-focus front lens group for selectively positioning said varifocal and front lens groups in operative alignment with said rear lens group, the combination of said front and rear lens group having the same back-focal length and substantially the same relative aperture as the combination of said rear lens group with said varifocal lens group.

4. A system as defined in claim 3 wherein said front lens group consists of a negative member and a positive member air-spaced from said negative member and disposed rearwardly thereof.

5. A system as defined in claim 4 wherein the numerical values of the radii of curvature (r25 to r28) and the thicknesses and air spaces (d24 to d26) of said negative member L14 and said positive member L15, their refractive indices $n_d$ and their Abbé numbers $\nu$ are substantially as given in the following table:

| Lens | Radii | Thicknesses and Air Spaces | $n_d$ | $\nu$ |
|---|---|---|---|---|
| L14 | r25=−392.80<br>r26=+159.20 | d24=7.50<br>d25=20.85 | 1.75692<br>Air Space | 31.74 |
| L15 | r27=+196.95<br>r28=−429.00 | d26=12.50 | 1.78470 | 26.10 |

6. A system as defined in claim 4 wherein said negative member consists of two cemented lenses (L16, L17) and said positive member consists of two cemented lenses (L18, L19), the numerical values of the radii of curvature (r29 to r34) and the thicknesses and air spaces (d27 to d31) of said cemented lenses, their refractive indices $n_d$ and their Abbé numbers $\nu$ being substantially as given in the following table:

| Lens | Radii | Thicknesses and Air Spaces | $n_d$ | $\nu$ |
|---|---|---|---|---|
| L16 | r29=−325.40<br>r30=+58.70 | d27=5.00 | 1.63636 | 35.35 |
| L17 | r31=+128.30 | d28=12.50<br>d29=13.55 | 1.67790<br>Air Space | 55.52 |
| L18 | r32=+157.80<br>r33=−56.60 | d30=15.00 | 1.63980 | 34.60 |
| L19 | r34=−380.70 | d31=5.00 | 1.63854 | 55.43 |

References Cited
UNITED STATES PATENTS
3,000,259   9/1961   Turula et al.   88—57
3,024,714   3/1962   Keznickl   95—44
3,030,860   4/1962   Hayes   88—57 X DAVID H. RUBIN, *Primary Examiner.*

JOHN K. CORBIN, *Examiner.*

R. J. STERN, *Assistant Examiner.*